US005532079A

United States Patent [19]
Tribioli et al.

[11] Patent Number: 5,532,079
[45] Date of Patent: Jul. 2, 1996

[54] ELECTROLYTE-ACTIVATED BATTERY

[75] Inventors: Silvano Tribioli; Vito Giardinelli, both of Leghorn; Francesco Rocco; Franco Cerrano, both of Turin, all of Italy

[73] Assignees: Whitehead Alenia Sistemi Subacquei S.p.A., Genoa; Microtecnica S.p.A., Turin, both of Italy

[21] Appl. No.: 393,871

[22] Filed: Feb. 24, 1995

[30] Foreign Application Priority Data

Feb. 25, 1994 [IT] Italy .................... TO94A0127

[51] Int. Cl.$^6$ .................................................. H01M 6/34
[52] U.S. Cl. .................................... 429/119; 429/206
[58] Field of Search .................................. 429/119, 206

[56] References Cited

U.S. PATENT DOCUMENTS 3,463,671  8/1969  Doll ............................ 136/160
4,435,487  3/1984  Supelak ........................ 429/70
4,710,438  12/1987  Leben .......................... 429/119

Primary Examiner—John S. Maples
Attorney, Agent, or Firm—Ladas & Parry

[57] ABSTRACT

An electrolyte-activated battery, particularly for generating electric energy for the propulsion of underwater systems, and presenting a reservoir, an electrochemical cell, and a system for forming and circulating the electrolyte between the reservoir and the electrochemical cell; the electrolyte forming and circulating system presenting an inlet conduit communicating with the outside environment, a circulating pump, a device for regulating the temperature of the electrolyte at the inlet of the electrochemical cell, and a gas separator located at the outlet of the electrochemical cell and presenting a liquid phase outlet, and a gaseous phase outlet connected to an outlet conduit; the system also presenting a switching device for selectively connecting the liquid phase outlet to the inlet conduit and the outlet conduit.

12 Claims, 2 Drawing Sheets

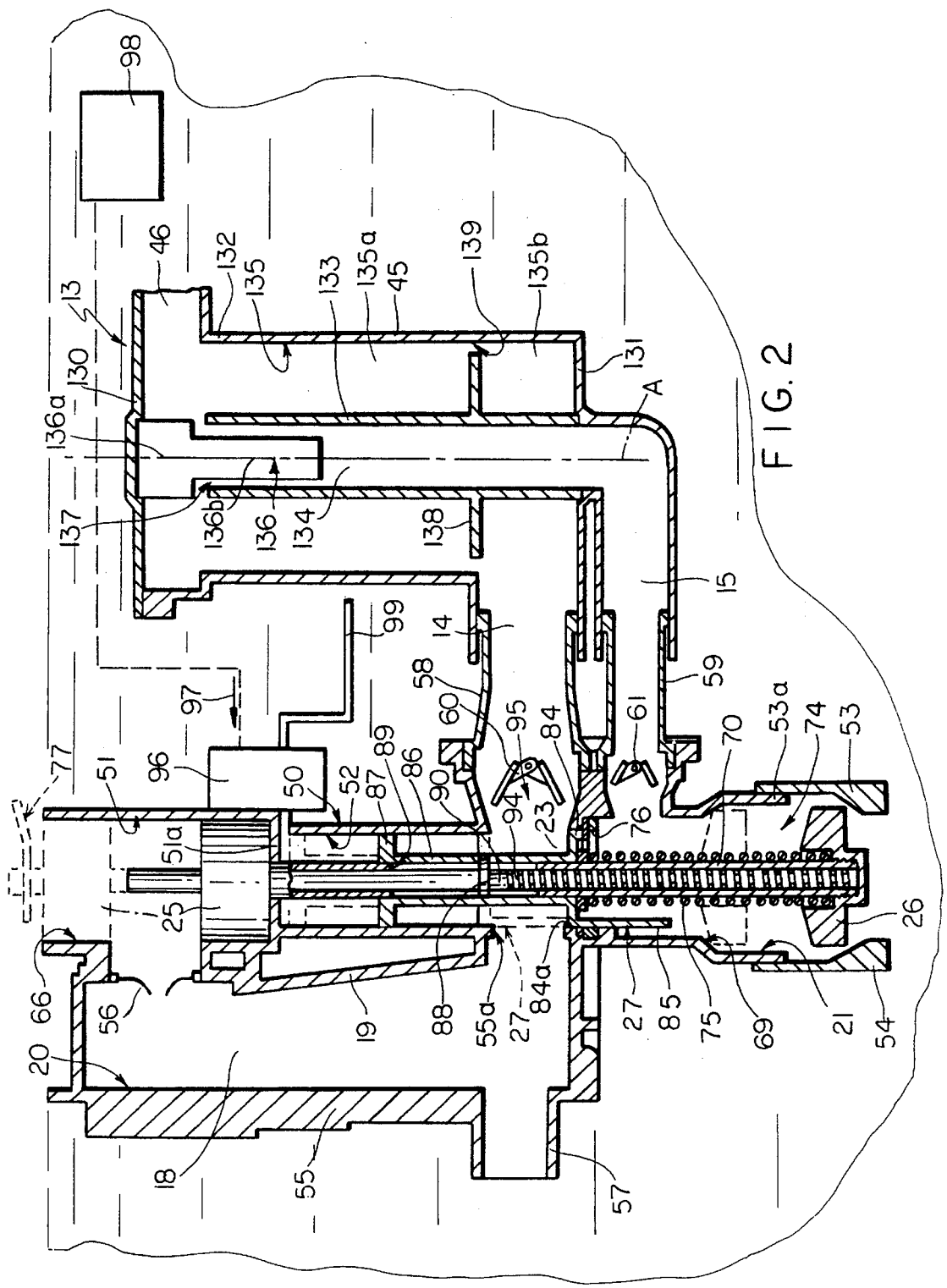

ELECTROLYTE-ACTIVATED BATTERY

BACKGROUND OF THE INVENTION

The present invention relates to an electrolyte-activated alkaline battery, particularly for generating electric energy for the propulsion of underwater systems.

Known batteries of the above type substantially comprise an electrochemical cell; a reservoir containing an anhydrous alkaline compound dissolvable in sea water to form a liquid electrolyte; and a system for forming and circulating the liquid electrolyte between the reservoir and the electrochemical cell.

According to one known solution, described for example in European Patent EP-B-0 307 292, the electrolyte forming and circulating system comprises a sea water inlet conduit; a pump communicating at the intake side with the inlet conduit, and at the delivery side with the reservoir; a device for regulating the temperature of the electrolyte supplied to the electrochemical cell; and a centrifugal gas separator connected to the outlet of the electrochemical cell, and presenting a liquid phase outlet and a gaseous phase outlet. The gaseous phase outlet communicates with the outside environment via an exhaust conduit with a nonreturn valve for preventing inflow of sea water; and the liquid phase outlet is connected to the inlet conduit, and hence to the intake side of the pump, via an closure valve which is closed during certain operating stages of the battery in which the system operates in open-loop mode and sea water is drawn in from the outside, and is open during normal operation in which the system defines a closed-loop circuit for circulating the electrolyte between the reservoir and the electrochemical cell.

More specifically, the closure valve is closed during initial activation of the battery—in which the pump draws sea water into the reservoir to dissolve the anhydrous alkaline compound and form the liquid electrolyte—and during drainage and deactivation of the battery—in which respectively part or all of the electrolyte is drained off and replaced with sea water.

Batteries of the above type present a major drawback.

When draining and deactivating the battery, the liquid phase outlet is closed so that the liquid is forced out along the gaseous phase exhaust conduit, thus resulting in highly irregular two-phase flow and a sharp deceleration in outflow of the electrolyte.

Following drainage of the battery, a relatively long time is required for normal operating conditions, and particularly steady-state centrifugation of the liquid, to be restored.

Finally, the reduction in outflow speed of the electrolyte is even more critical in emergency situations in which the battery must be deactivated rapidly to avoid the risk of explosion.

SUMMARY OF THE INVENTION

It is an object of the present invention to provide an electrolyte-activated battery designed to overcome the aforementioned drawbacks typically associated with known types.

According to the present invention, there is provided an electrolyte-activated battery, particularly for the propulsion of underwater systems, and comprising:

an electrochemical cell;

a reservoir containing at least one anhydrous alkaline compound dissolvable in sea water to form a liquid electrolyte; and a system for forming and circulating the liquid electrolyte between the reservoir and the electrochemical cell;

said system in turn comprising:

an inlet conduit communicating with the outside environment;

a pump for circulating the electrolyte, and connected at the intake side to the inlet conduit, and at the delivery side to the reservoir;

electrolyte temperature regulating means interposed between the reservoir and the inlet of the electrochemical cell;

a gas separator presenting an inlet connected to the outlet of the electrochemical cell; a gaseous phase outlet connected to the outside environment; and a liquid phase outlet; and a switching device for selectively connecting the liquid phase outlet of the gas separator to the intake side of the pump;

characterized in that it comprises connecting means for connecting said liquid phase outlet of said gas separator to the outside environment; said switching device comprising closure means for selectively connecting said liquid phase outlet of said gas separator to said inlet conduit and to said means for connection to the outside environment.

BRIEF DESCRIPTION OF THE DRAWINGS

A preferred, non-limiting embodiment of the present invention will be described by way of example with reference to the accompanying drawings, in which:

FIG. 2 shows a larger-scale view of a detail in FIG. 1.

DETAILED DESCRIPTION OF THE INVENTION

Figure 1:
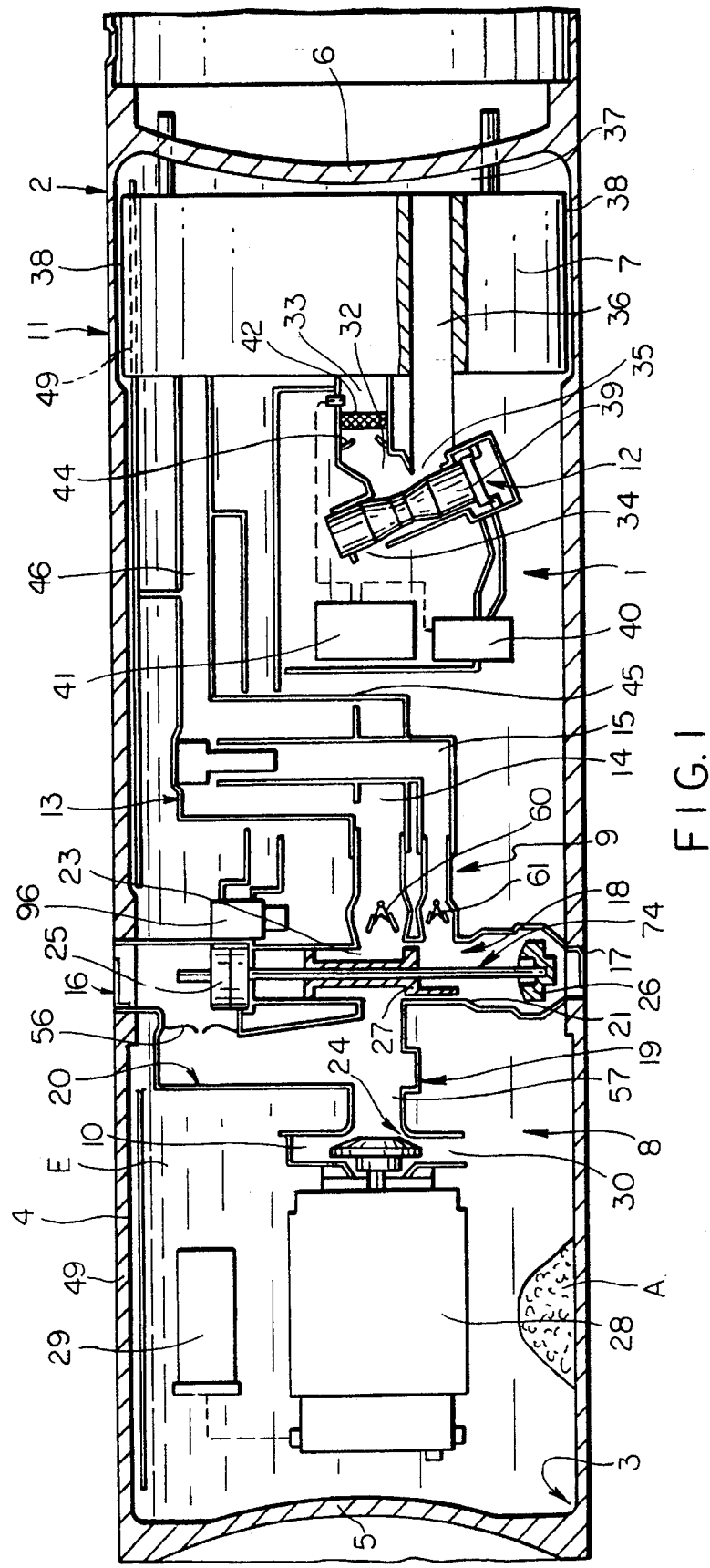
FIG. 1 shows a schematic axial section of a battery in accordance with the teachings of the present invention.

Number 1 in FIG. 1 indicates an alkaline battery activatable for generating electric energy for the propulsion of an underwater system 2 (shown partially), e.g. a torpedo.

Battery 1 is housed inside a compartment 3 of torpedo 2, defined by a substantially cylindrical lateral wall 4 and by two transverse walls 5, 6 of the torpedo.

Battery 1 substantially comprises a known, e.g. Al-AgO, electrochemical cell 7 housed close to one axial end of compartment 3; and a reservoir 8 defined by the remaining portion of compartment 3, and containing an anhydrous alkaline compound A, e.g. soda or potassium carbonate, dissolvable in the sea water fed, in use, into the reservoir to form a liquid electrolyte E.

Battery 1 also comprises a system, housed in reservoir 8 and indicated as a whole by 9, for forming and circulating electrolyte E between reservoir 8 and electrochemical cell 7.

System 9 substantially comprises a pump 10 for circulating electrolyte E; a heat exchanger 11 and thermostatic valve 12 for controlling the temperature of electrolyte E entering electrochemical cell 7; and a gas separator 13 at the outlet of electrochemical cell 7, for separating from electrolyte E the hydrogen produced during the discharge reaction, and which presents a liquid phase outlet 14 and a gaseous phase outlet 15.

In use, system 9 communicates with the outside environment via an inlet 16 for admitting sea water into reservoir 8, and via an outlet 17 for expelling the hydrogen produced during the discharge reaction of the battery and, in particular operating conditions described later on, for expelling electrolyte E.

Inlet 16 and outlet 17 are conveniently formed facing and coaxial with each other in a top and bottom portion respectively of lateral wall 4 of torpedo 2.

Finally, system 9 comprises a valve 18 interfacing with the outside environment, for selecting the operating mode of the device and hereinafter referred to simply as a "mode valve".

Mode valve 18 comprises a hollow body 19 defining an inlet conduit 20 communicating with inlet 16, and an outlet conduit 21 communicating with outlet 17; which conduits 20, 21 communicate with a central chamber 23 connected to the liquid phase outlet 14 of the gas separator, and are respectively connected, close to chamber 23, to the intake port 24 of pump 10 and to the gaseous phase outlet 15 of the gas separator.

Valve 18 also comprises closure members 25, 26 for inlet and outlet conduits 20, 21 respectively, for isolating battery 1 from the outside environment during storage; and a further closure member 27 for selectively isolating conduits 20, 21 from chamber 23 as described later on.

The above components of system 9 will now be described in more detail.

Pump 10 is driven by an electric d.c. motor 28 supplied by an auxiliary battery 29 during activation of battery 1, and by battery 1 itself when activated.

The delivery side 30 of pump 10 terminates directly inside reservoir 8 which is thus pressurized by pump 10.

Electrolyte E is fed into electrochemical cell 7 via thermostatic valve 12 which provides for mixing, in appropriate proportions, a stream of hot electrolyte E from reservoir 8, and a stream of electrolyte E cooled by heat exchanger 11. More specifically, valve 12 is a three-way valve, and presents an outlet 32 communicating with electrochemical cell 7 via a conduit 33; a first inlet 34 communicating directly with reservoir 8; and a second inlet 35 communicating with a conduit 36 extending through electrochemical cell 7 and communicating with a compartment 37 of reservoir 8, formed between cell 7 and adjacent wall 6. Compartment 37 forms the output manifold of heat exchanger 11 which comprises a number of longitudinal channels 38 formed on the inner face of lateral wall 4 enclosing cell 7, and which provide for feeding electrolyte E from reservoir 8 to compartment 37, and for effecting heat exchange between the electrolyte and outside sea water.

Thermostatic valve 12 comprises a movable member 39 for varying the openings between each inlet 34, 35 and outlet 32, and which is controlled hydraulically by a solenoid valve 40 in turn controlled by an electronic unit 41. No detailed description is given herein of thermostatic valve 12 and the relative control, as they do not form part of the present invention.

Conduit 33 for feeding electrolyte E into cell 7 is fitted inside with a diaphragm 44 designed to pierce at a predetermined relative pressure of, say, 3 bar; and, downstream from diaphragm 44, with a filter 42 for preventing the entry of foreign bodies into cell 7.

Gas separator 13 comprises a cylindrical outer casing 45 in turn presenting a vertical axis A, a top wall 130, a bottom wall 131, and a lateral wall 132; and an inner tubular element 133 coaxial with casing 45, extending from bottom wall 131, and which defines an inner axial chamber 134, and, together with lateral wall 132 of casing 45, an annular outer chamber 135.

A body 136 extends axially inwards of casing 45 from top wall 130, and presents a cylindrical base portion 136a with a diameter substantially equal to the outside diameter of tubular element 133, and an end portion 136b engaging element 133 in radially slack manner and defining with it an annular passage 137 connecting inner chamber 134 to outer chamber 135.

Outer chamber 135 communicates with the outlet of electrochemical cell 7 via an inlet conduit 46 terminating tangentially at the top end of chamber 135, and the bottom end of chamber 135 communicates with a tangential conduit defining liquid phase outlet 14.

Inner chamber 134 communicates at the bottom with a conduit extending from bottom wall 131 of casing 45 and forming gaseous phase outlet 15.

Chamber 135 is fitted inside with a circular partition 138 extending radially from tubular element 133 immediately upstream from liquid phase outlet 15, and defining, with lateral wall 132 of casing 45, an annular passage 139. Chamber 135 is thus divided into a top portion 135a communicating with inlet conduit 46; and a bottom portion 135b communicating with outlet 15; the two portions 135a, 135b communicating with each other via annular passage 139.

Inlet conduit 46 of gas separator 13 communicates, via small-section tubes 49, with a top portion of compartment 37 and an opposite top portion of reservoir 8.

Body 19 of mode valve 18 is conveniently made of plastic material resistant to electrolyte E, and comprises a first tubular element 50 with a straight axis, and extending crosswise to reservoir 8 from inlet 16 to outlet 17. More specifically, tubular element 50 comprises a top end portion 51 fixed at inlet 16, defining a first portion of inlet conduit 20, and defined at the bottom by a partition 51a separating it from an intermediate cylindrical chamber 52. Chamber 52 terminates at the bottom in a central portion of element 50 defining said chamber 23; and the bottom portion of element 50 defines a first portion of outlet conduit 21, and presents a larger-diameter end 53a connected to outlet 17 by a sleeve 53 connected telescopically in fluidtight manner to end 53a and fitted by an end flange 54 to wall 4 and about the periphery of outlet 17.

Body 19 also comprises a shaped second tubular element 55 with a substantially C-shaped axis, and which connects end portion 51 of first tubular element 50 to chamber 23 inside which it terminates via an opening 55a to define the remaining portion of inlet conduit 20. The inlet of tubular element 55 is sealed by a diaphragm 56 pierceable by a predetermined small pressure difference, of the order of a few tenths of a bar, to prevent the untimely admission of sea water into system 9 as described below.

At the end connected to chamber 23, tubular element 55 presents a sleeve 57 for connection to the intake side 24 of pump 10, as described previously.

Body 19 of mode valve 18 is connected to the liquid phase outlet 14 of gas separator 13 by a first sleeve 58 communicating with chamber 23, and to the gaseous phase outlet 15 of the separator by a second sleeve 59 communicating with outlet conduit 21 on the opposite side to tubular element 55.

Sleeves 58 and 59 house respective nonreturn valves 60, 61 (FIG. 2) for permitting flow from the gas separator to outlet conduit 21, and preventing flow in the opposite direction.

Mode valve 18 also comprises an closure device 74 housed in body 19 and in turn comprising closure members 25, 26, which consist of circular plugs facing each other and cooperating in fluidtight manner with respective seats 66, 69 formed respectively at the inlet of conduit 20, immediately downstream from inlet 16, and inside conduit 21, immediately downstream from sleeve 59.

Device 74 also comprises a rigid tubular rod 70 connecting closure members 25, 26, which conveniently present the same cross section so that they are subjected to the same but opposite hydrostatic pressure when the torpedo is launched, and closure device 74 of mode valve 18 therefore operates in conditions of hydrostatic equilibrium at any immersion depth.

Closure device 74 is movable axially between a closed position (shown by the dotted line in FIG. 2) wherein closure members 25, 26 cooperate in fluidtight manner with respective seats 66, 69, and a lowered open position (shown by the continuous line) wherein closure members 25, 26 are respectively housed in portion 51 of inlet conduit 20 and in the portion of outlet conduit 21 defined by sleeve 53.

Closure device 74 is subjected to the downward elastic pressure, i.e. towards the open position, generated by a helical spring 75 externally coaxial with rod 70 and compressed between closure member 26 and a shoulder ring 76 fitted inside tubular element 50, between chamber 23 and outlet conduit 21; and is maintained in the closed position by an arming device 77 cooperating with it through inlet 16, and securing it removably to the launching tube.

Closure member 27 of mode valve 18 comprises a disk 84 cooperating in fluidtight manner with a seat 84a interposed between chamber 23 and outlet conduit 21; and a wall 85 projecting integrally downwards from a peripheral portion of disk 84, and which opens and closes opening 55a between chamber 23 and inlet conduit 20. Closure member 27 is integral with a rod 86 externally coaxial with rod 70 and in turn integral with a hydraulic piston 87 sliding in fluidtight manner inside cylindrical chamber 52. Rod 86 is fitted with a transverse pin 88 engaging in sliding manner respective longitudinal slots 89 formed along opposite generating lines of rod 70, and which forms an upper axial stop for the end supporting element 90 of a helical spring 94 housed inside rod 70 and compressed between element 90 and closure member 26.

Closure member 27, rod 86 and piston 87 combine to define a switching device 95 of mode valve 18, which device is movable between a raised position (shown by the dotted line) wherein wall 85 cooperates in fluidtight manner with opening 55a to isolate chamber 23 from inlet conduit 20, and a lowered position (shown by the continuous line) wherein disk 84 cooperates in fluidtight manner with seat 84a to isolate chamber 23 from outlet conduit 21, and chamber 23 communicates freely with inlet conduit 20.

Piston 87 is controlled hydraulically by a device 96 (not forming part of the present invention and therefore not described in detail) in response to an electric enabling signal 97 generated by a central torpedo control unit 98, and a hydraulic signal 99 derived from, and indicating the presence of pressurized electrolyte E in, conduit 46.

Battery 1 operates as follows.

Prior to launching, mode valve 18 is set as shown by the dotted line FIG. 2, wherein closure members 25, 26 are closed by arming device 77; and activating device 96 is idle so that closure member 27 is raised to connect both outlets 14, 15 of gas separator 13 to outlet conduit 21.

When the torpedo is launched, arming device 77 releases closure device 74 of mode valve 18, which, by virtue of spring 75, moves from the closed position (dotted line in FIG. 2) to the open position (continuous line in FIG. 2) wherein inlet conduit 20 and outlet conduit 21 communicate with the outside environment; and diaphragm 56 prevents any untimely admission of water, e.g. due to spray, until the torpedo is immersed and the pressure at the inlet exceeds the piercing threshold of the diaphragm. Any water entering conduit 21 is ineffective, by virtue of nonreturn valves 60, 61 preventing it from reaching gas separator 13 and electrochemical cell 7.

The incoming water from inlet conduit 20 flows to pump 10 by which it is fed into reservoir 8 where it begins to dissolve anhydrous compound A to form liquid electrolyte E; electrolyte E fills reservoir 8 and, via channels 38 of exchanger 11, compartment 37; and the gas in reservoir 8 and compartment 37 forms a pocket at the top from which it is expelled by tubes 49, gas separator 13, nonreturn valves 60, 61 and outlet conduit 21.

Electrolyte E also flows into inlet conduit 33 of cell 7 through thermostatic valve 12, but is prevented by diaphragm 44 from entering cell 7 until reservoir 8 fills up and the pressure of electrolyte E exceeds the piercing threshold of diaphragm 44, at which point the electrolyte flows into cell 7 through filter 42.

As it fills up, the gas inside cell 7 is expelled by conduit 46, gas separator 13 and outlet conduit 21. When cell 7 is filled completely with electrolyte E, the pressure in conduit 46 increases and, in the presence of electric enabling signal 97 from control unit 98, switches activating device 96; chamber 52 of piston 87 is pressurized; and piston 87 moves down to move closure member 27 from the dotted line to the continuous line position in opposition to spring 94.

The liquid phase outlet 14 of gas separator 13 is now connected to the bottom end of inlet conduit 20 and hence to the intake side 24 of pump 10, as opposed to outlet conduit 21, thus resulting in closed-loop operation of system 9.

More specifically, electrolyte E pressurized by pump 10 is fed into cell 7 by thermostatic valve 12, partly from reservoir 8 directly, and partly through heat exchanger 11, the proportions depending on actual operating conditions and the required operating temperature of the battery; from cell 7, in which the discharge reaction is produced, generating electric energy, heat, and reaction products (mainly hydrogen and aluminates), electrolyte E flows along conduit 46 into gas separator 13 where the gaseous phase is almost entirely separated from the liquid phase and expelled through outlet 15.

Separator 13 is a centrifugal type, and gas-liquid separation is effected in known manner by exploiting the difference in density of the liquid and gaseous phases of the incoming mixture. The denser liquid phase collects along the lateral wall of casing 45 and flows towards portion 135b and outlet 14 through passage 139; while the gas is driven towards a central portion of portion 135a of chamber 135, adjacent to tubular element 133 into which it flows along passage 137.

The electrolyte E cleansed of the gaseous phase issues from separator 13 through outlet 14 and is fed back to pump 10 via mode valve 18.

Under normal operating conditions, no sea water enters and no electrolyte E issues from inlet conduit 20, by virtue of the electrolyte intake of pump 10 being equal to the amount of electrolyte fed back to the pump from gas separator 13.

The permanent connection between the sea and the hydraulic circuit of the battery via inlet conduit 20 presents the advantage of enabling the battery to operate under balanced pressure conditions, so that the mechanical components, in particular the casing and the components of circulating device 9, are subjected to only small differences in pressure and as such may be reduced in weight.

An increase in the concentration of reaction products, typically aluminates, results in an increase in the internal resistance, and hence a reduction in the voltage, of the battery, and an excessive accumulation of such products may even arrest the discharge reaction.

When the battery voltage reaches a minimum threshold value—or in any other operating situations requiring aluminate removal, as when switching to a high-speed stage of the mission—control unit 98 de-energizes activating device 96 which restores switching device 95 to the raised position wherein the liquid phase outlet 14 of the gas separator communicates with outlet conduit 21.

In this condition, or drain mode, the electrolyte E polluted by the reaction products is drained off into the sea and replaced by fresh sea water drawn in via conduit 20.

Even in this operating mode, however, operation of gas separator 13 remains unchanged, by virtue of the liquid and gaseous phases being directed to outlet conduit 21 via independent outlets 14 and 15.

Upon control unit 98 detecting an acceptable battery voltage—or after a predetermined time, in the case of a mission stage switch—activating device 96 is again energized to restore the closed-loop operating mode described above; which mode is restored immediately, by virtue of flow inside the gas separator being substantially unchanged.

In an emergency, or to salvage the torpedo at the end of the mission in the case of a launching exercise, the battery is deactivated by again switching mode valve device 95 to the open-loop configuration described above, until all the electrolyte E has been drained off and replaced with sea water, and the battery has been washed.

The advantages of the battery according to the teachings of the present invention will be clear from the foregoing description.

In particular, the liquid and gaseous phase outlets of the gas separator are independent in any operating condition of the battery. More specifically, when draining or deactivating the battery, liquid phase outlet 15 is connected directly to outlet conduit 21, thus eliminating any interference between the two phases and in no way affecting operation of the gas separator.

As such, partial or complete drain-off of electrolyte E is effected smoothly and rapidly, thus enabling closed-loop operation to be restored immediately after drainage, and safe, rapid deactivation of the battery at the end of the mission.

Moreover, tubular element 133, body 136, and partition 138 defining selective passages 137, 139 for the gaseous and liquid phases provide for a high degree of efficiency of the gas separator, and for eliminating at least 97% of the reaction gas from electrolyte E.

A further advantage of the battery according to the present invention is the highly compact design of the mode valve, which incorporates the inlet and outlet conduits, the closure device, the fittings for connection to the circulating pump and to the gas separator outlets, and the device for switching from open- to closed-loop operating mode.

Clearly, changes may be made to battery 1 as described and illustrated herein without, however, departing from the scope of the present invention.

We claim:

1. An electrolyte-activated battery, particularly for the propulsion of underwater systems, and comprising:
   an electrochemical cell (7);
   a reservoir (8) containing at least one anhydrous alkaline compound (A) dissolvable in sea water to form a liquid electrolyte (E); and
   a system (9) for forming and circulating the liquid electrolyte (E) between the reservoir (8) and the electrochemical cell (7);
   said system (9) in turn comprising:
   an inlet conduit (20) communicating with the outside environment;
   a pump (10) for circulating the electrolyte (E), and connected at an intake side to the inlet conduit (20), and at a delivery side to the reservoir (8);
   electrolyte temperature regulating means (11, 12, 40, 41) interposed between the reservoir (8) and an inlet of the electrochemical cell (7);
   a gas separator (13) presenting an inlet (46) connected to an outlet of the electrochemical cell (7);
   a gaseous phase outlet (15) connected to the outside environment; and a liquid phase outlet (14); and
   a switching device (95) for selectively connecting the liquid phase outlet (14) of the gas separator (13) to the intake side (24) of the pump (10);
   characterized in that said battery comprises connecting means (21) for connecting said liquid phase outlet (14) of said gas separator (13) to the outside environment; said switching device (95) comprising closure means (27) for selectively connecting said liquid phase outlet (14) of said gas separator (13) to said inlet conduit (20) and to said means (21) for connection to the outside environment.

2. A battery as claimed in claim 1, characterized in that said means for connecting said liquid phase outlet (14) of said gas separator (13) comprise an outlet conduit (21) to which said gaseous phase outlet (15) is connected.

3. A battery as claimed in claim 2, characterized in that said battery comprises two nonreturn valves (60, 61) interposed respectively between said outlets (14, 15) of said gas separator (13) and said outlet conduit (21).

4. A battery as claimed in claim 2, characterized in that said closure means comprise an closure member (27) movable between a first position wherein it is interposed between said liquid phase outlet (14) of said gas separator (13) and said inlet conduit (20), and a second position wherein it is interposed between said liquid phase outlet (14) of said gas separator (13) and said outlet conduit (21); and actuating means (87) for controlling said closure member.

5. A battery as claimed in claim 4, characterized in that said actuating means comprise a hydraulic piston (87) connected to said closure member (27) and for moving said closure member (27) from said first to said second position in opposition to elastic means (94).

6. A battery as claimed in claim 5, characterized in that said battery comprises an electrohydraulic device (96) for controlling said switching device (95); said control device (96) providing for feeding electrolyte (E) pressurized by said pump into the operating chamber (52) of said piston (87) in the presence of an electric enabling signal (97) supplied by a control unit (98), and in the presence of a hydraulic signal (99) derived from the outlet conduit of said electrochemical cell (7) and indicating said cell (7) is completely full of said electrolyte (E).

7. A battery as claimed in claim 1,
   characterized in that said gas separator (13) comprises an axial inner chamber (134) communicating with said gaseous phase outlet (15); and an outer annular chamber (135) communicating tangentially at opposite axial ends with said inlet (46) of the gas separator (13) and with said liquid phase outlet (14); said chambers (134, 135) communicating with each other via at least one passage (137).

8. A battery as claimed in claim 7, characterized in that said gas separator (13) comprises a partition (138) dividing said outer annular chamber (135) into a first portion (135a) communicating with said inlet (46) of the gas separator, and a second portion (135b) communicating with said liquid phase outlet (14); said portions (135a, 135b) communicating with each other via at least one passage (139) at the periphery of said outer annular chamber (135).

9. A battery as claimed in claim 1,
characterized in that said battery comprises a closure device (74) for opening and closing said inlet conduit (20) and said outlet conduit (21), and in turn comprising closure members (25, 26) cooperating respectively in fluidtight manner with said conduits (20, 21) during storage of the battery (1), and a rigid rod (70) for mutually connecting said closure members (25, 26).

10. A battery as claimed in claim 9, characterized in that a piston (87) of said switching device (95) is coaxial with said rod (70) of said closure device (74); and an elastic means comprise a spring (94) housed inside said rod (70).

11. A battery as claimed in claim 9, characterized in that said battery comprises a mode valve (18) incorporating said closure device (74) and said switching device (95); said mode valve (18) comprising an outer body (19) housed in said reservoir (8), defining said inlet conduit (20) and said outlet conduit (21), and presenting fastening means (57, 58, 59) for connection to said pump (10) and to said outlets (14, 15) of said gas separator (13); said closure device (74) and said switching device (95) being housed in said outer body (19).

12. A battery as claimed in claim 1,
characterized in that said battery comprises small-diameter tubes (49) connecting opposite upper portions of said reservoir to said inlet (46) of said gas separator (13).

* * * * *